(12) United States Patent
Wakabayashi et al.

(10) Patent No.: US 10,333,653 B2
(45) Date of Patent: Jun. 25, 2019

(54) COMMUNICATIONS DEVICE AND METHODS

(71) Applicant: SONY CORPORATION, Tokyo (JP)

(72) Inventors: Hideji Wakabayashi, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/507,274

(22) PCT Filed: Aug. 6, 2015

(86) PCT No.: PCT/EP2015/068157
§ 371 (c)(1),
(2) Date: Feb. 28, 2017

(87) PCT Pub. No.: WO2016/050402
PCT Pub. Date: Apr. 7, 2016

(65) Prior Publication Data
US 2017/0264395 A1 Sep. 14, 2017

(30) Foreign Application Priority Data

Sep. 29, 2014 (EP) .................................... 14186921

(51) Int. Cl.
*H04L 1/18* (2006.01)
*H04L 1/08* (2006.01)
(Continued)

(52) U.S. Cl.
CPC .............. *H04L 1/08* (2013.01); *H04L 1/1607* (2013.01); *H04L 1/1819* (2013.01); *H04W 76/14* (2018.02)

(58) Field of Classification Search
CPC ....... H04L 1/08; H04L 1/1607; H04L 1/1819; H04W 76/023; H04W 76/14
See application file for complete search history.

(56) References Cited

U.S. PATENT DOCUMENTS 6,101,168 A 8/2000 Chen et al.
2004/0010744 A1 1/2004 Chen et al.
(Continued)

FOREIGN PATENT DOCUMENTS

EP 1 033 005 9/2000
WO 2015/113690 A1 8/2015
(Continued)

OTHER PUBLICATIONS

Xingqin Lin, et al., "Smart-Device-to-Smart-Device Communications an Overview of 3GPP Device-to-Device Proximity Services," IEEE Communications Magazine, XP011546525, Apr. 2014, pp. 40-48.
(Continued)

*Primary Examiner* — Samir W Rizk
(74) *Attorney, Agent, or Firm* — Xsensus LLP

(57) ABSTRACT

A communications device and method of communicating using a communications device is disclosed for performing device-to-device communications. The communications device is configured to divide data for transmission into a plurality of data units, to encode a first of the data units, at the communications device for transmission to a destination communications device in accordance with a hybrid automatic repeat request, HARQ, protocol. The encoding provides redundant data, which can improve an integrity of correctly recovering the first data unit when received by the destination communications device and provide an indication of whether the first data unit has been received correctly. The communications device transmits the encoded data unit to the destination communications device, and either receives, from the destination communications device, an acknowledgement message, ACK, indicating that the data unit has been received correctly by the destination communications device, or if, after a predetermined time has
(Continued)

elapsed, an ACK message is not received by the communications device, then retransmits at least part of the encoded data unit to the destination communications device in accordance with the HARQ process, the communications device assuming that the destination communications device determined that the data unit was not received correctly in accordance with a decoding process performed by the destination communications device. Alternatively the communications device receives, from the destination communications device, a negative acknowledgement message, NACK, providing an indication that the destination communications device determined that the data unit was not received correctly in accordance with a process of decoding the received encoded data unit performed by the destination communications device, or if, after a predetermined time has elapsed, an ACK message is not received then the communications devices encodes a next one of the data units, and transmitting the next encoded data unit to the destination communications device in accordance with the HARQ protocol.

19 Claims, 9 Drawing Sheets

(51) Int. Cl.
*H04W 76/14* (2018.01)
*H04L 1/16* (2006.01)

(56) References Cited

U.S. PATENT DOCUMENTS

| | | | |
|---|---|---|---|
| 2005/0050432 A1 | 3/2005 | Chen et al. | |
| 2005/0094667 A1* | 5/2005 | Dahlman | H04L 1/1819 370/473 |
| 2011/0211522 A1* | 9/2011 | Chung | H04L 1/1822 370/315 |
| 2012/0131406 A1 | 5/2012 | Chen et al. | |
| 2012/0163226 A1* | 6/2012 | Tomizawa | H04L 1/0027 370/252 |
| 2012/0300662 A1 | 11/2012 | Wang et al. | |
| 2013/0083742 A1 | 4/2013 | Baldemair et al. | |
| 2013/0170387 A1 | 7/2013 | Wang et al. | |
| 2014/0313996 A1* | 10/2014 | Suga | H04W 56/0045 370/329 |
| 2015/0016389 A1 | 1/2015 | Baldemair et al. | |

FOREIGN PATENT DOCUMENTS

| | | |
|---|---|---|
| WO | 2015/113696 A1 | 8/2015 |
| WO | 2015/113719 A1 | 8/2015 |
| WO | 2015/113720 A1 | 8/2015 |

OTHER PUBLICATIONS

RP-122009, "Study on LTE Device to Device Proximity Services," Qualcomm Incorporated, 3GPP TSG RAN Meeting #58, Dec. 2012, 6 pages.
3GPP TR 23.703 V12.0.0 (Feb. 2014), "Technical Report $3^{rd}$ Generation Partnership Project; Technical Specification Group Services and System Aspects; Study on architecture enhancements to support Proximity-based Services (ProSe) (Release 12)," Feb. 2014, 324 pages.
3GPP TR 36.843 V12.0.0 (Mar. 2014), "Technical Report $3^{rd}$ Generation Partnership Project; Technical Specification Group Radio Access Network; Study on LTE device to device proximity services; Radio aspects (Release 12)," Mar. 2014, 49 pages.
R2-133840, "CSMA/CA based resource selection," Samsung, published at 3GPP TSG-RAN WG2 #84, Nov. 11-15, 2013, 4 pages.
R2-133990, "Network control for Public Safety D2D Communications", Orange, Huawei, HiSilicon, Telecom Italia, published at 3GPP TSG-RAN WG2 #84, Nov. 11-15, 2013, 5 pages.
R2-134246, "The Synchronizing Central Node for Out of Coverage D2D Communication", General Dynamics Broadband UK, published at 3GPP TSG-RAN2 #84, Nov. 11-15, 2013, 3 pages.
R2-134426, "Medium Access for D2D communication", LG Electronics Inc, published at 3GPP TSG-RAN WG2 #84, Nov. 11-15, 2013, 9 pages.
International Search Report dated Nov. 5, 2015 in PCT/EP2015/068157 filed Aug. 6, 2015.
R2-134238, "D2D Scheduling Procedure", Ericsson, published at 3GPP TSG-RAN WG2 #84, Nov. 11-15, 2013, 7 pages.
R2-134248, "Possible mechanisms for resource selection in connectionless D2D voice communication", General Dynamics Broadband UK, published at 3GPP TSG-RAN WG2 #84, Nov. 11-15, 2013, 9 pages.
R2-134431, "Simulation results for D2D voice services using connectionless approach", General Dynamics Broadband UK, published at 3GPP TSG-RAN WG2 #84, Nov. 11-15, 2013, 6 pages.
Ran Xiaogang, et al., "D2D Resource Allocation under the Control of BS", University of Electronic Science and Technology of China, https://mentor.ieee.org/802.16/dcn/13/16-13-0123-02-000n-d2d-resource-allocation-under-the-control-of-bs.docx, 2015, 7 pages.
Harri Holma, et al., "LTE for UMTS: OFDMA and SC-FDMA Based Radio Access," Wiley 2009, ISBN 978-0-470-99401-6, 4 pages.
European Office Action dated Oct. 17, 2018 in European Application No. 15 747 810.8-1215.
Bruno Bonnefont: "protocol theory—NACK vs. ACK? When to use one over the other one?—Network Engineering Stack Exchange", Sep. 10, 2014 (Sep. 10, 2014), pp. 1-2, XP055462853, Retrieved from the internet: URL: https://networkengineering.stackexchange.com/questions/6915/ nack-vs-ack-when-to-use-one-over-the-other-one.

* cited by examiner

COMMUNICATIONS DEVICE AND METHODS

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations, in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution for public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

SUMMARY OF THE DISCLOSURE

According to a first example embodiment of the present technique there is provided a method of communicating using a communications device via a wireless access interface to perform device-to-device communications. The method comprises dividing the data into a plurality of data units, and encoding a first of the data units, at the communications device for transmission to a destination communications device in accordance with a hybrid automatic repeat request, HARQ, protocol, the encoding providing redundant data which can improve an integrity of correctly recovering the first data unit when received by the destination communications device and provide an indication of whether the first data unit has been received correctly. The method comprises transmitting the encoded data unit to the destination communications device, and either receiving, from the destination communications device, an acknowledgement message, ACK, indicating that the data unit has been received correctly by the destination communications device, or if, after a predetermined time has elapsed, an ACK message is not received by the communications device, then retransmitting at least part of the encoded data unit to the destination communications device in accordance with the HARQ process, the communications device assuming that the destination communications device determined that the data unit was not received correctly in accordance with a decoding process performed by the destination communications device. Alternatively the method comprises receiving, from the destination communications device, a negative acknowledgement message, NACK, providing an indication that the destination communications device determined that the data unit was not received correctly in accordance with a process of decoding the received encoded data unit performed by the destination communications device, or if, after a predetermined time has elapsed, an ACK message is not received then encoding a next one of the data units, and transmitting the next encoded data unit to the destination communications device in accordance with the HARQ protocol.

According to the present technique therefore an efficient arrangement is provided for implementing an HARQ protocol on a D2D communications arrangement where there is a one-to-one communication between two communications devices. Furthermore, an efficient use of resources is provided in reducing signalling for transmission via the D2D communications resources, by not transmitting one of an ACK or a NACK message as would be required with a conventional HARQ process.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Conventional Communications System

Figure 1:
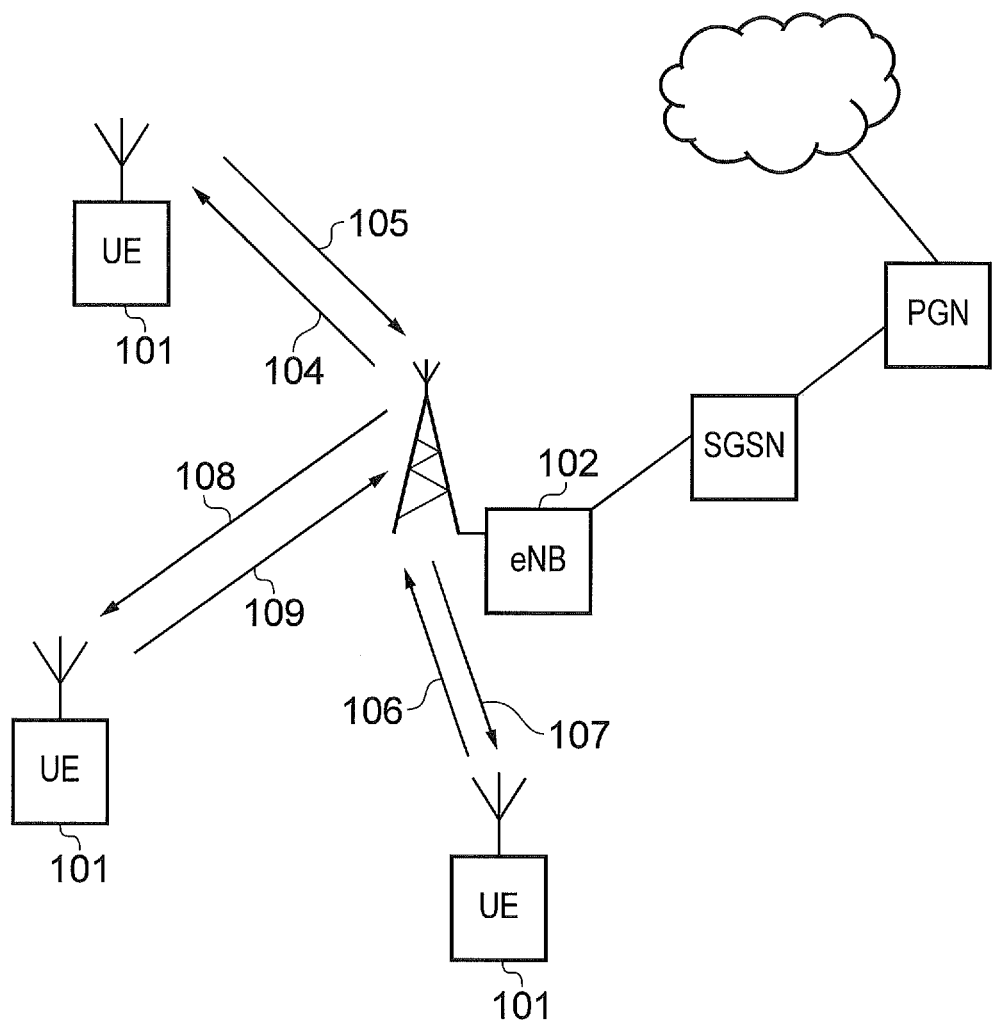
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to core network components such as a serving gateway support node 103 a packet data gateway 103.1 and an external network 103.2, which may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with a 3GPP Long Term Evolution (LTE) standard where the network entity and communications devices are commonly referred to as eNodeB and UEs, respectively.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Figure 2:
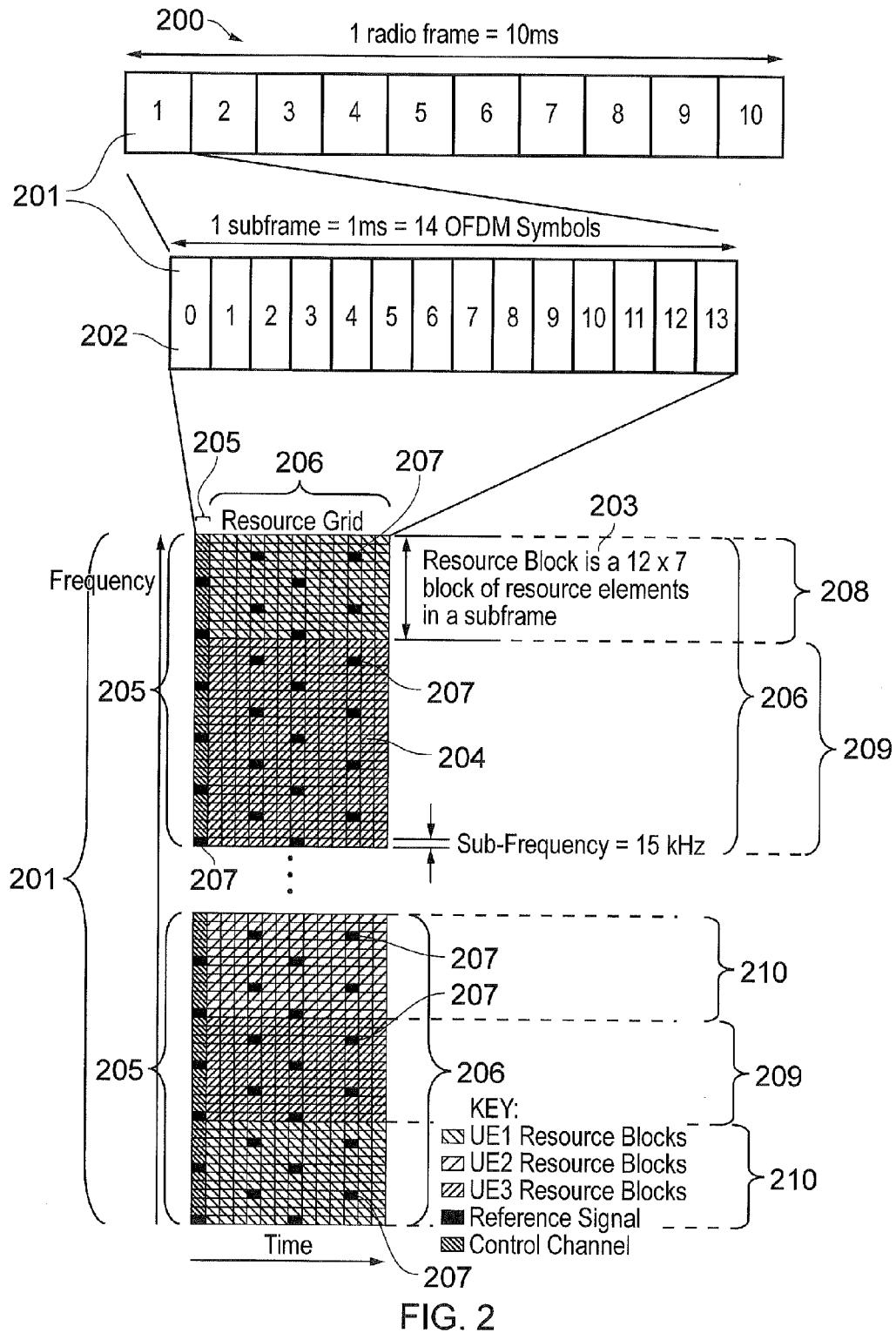
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
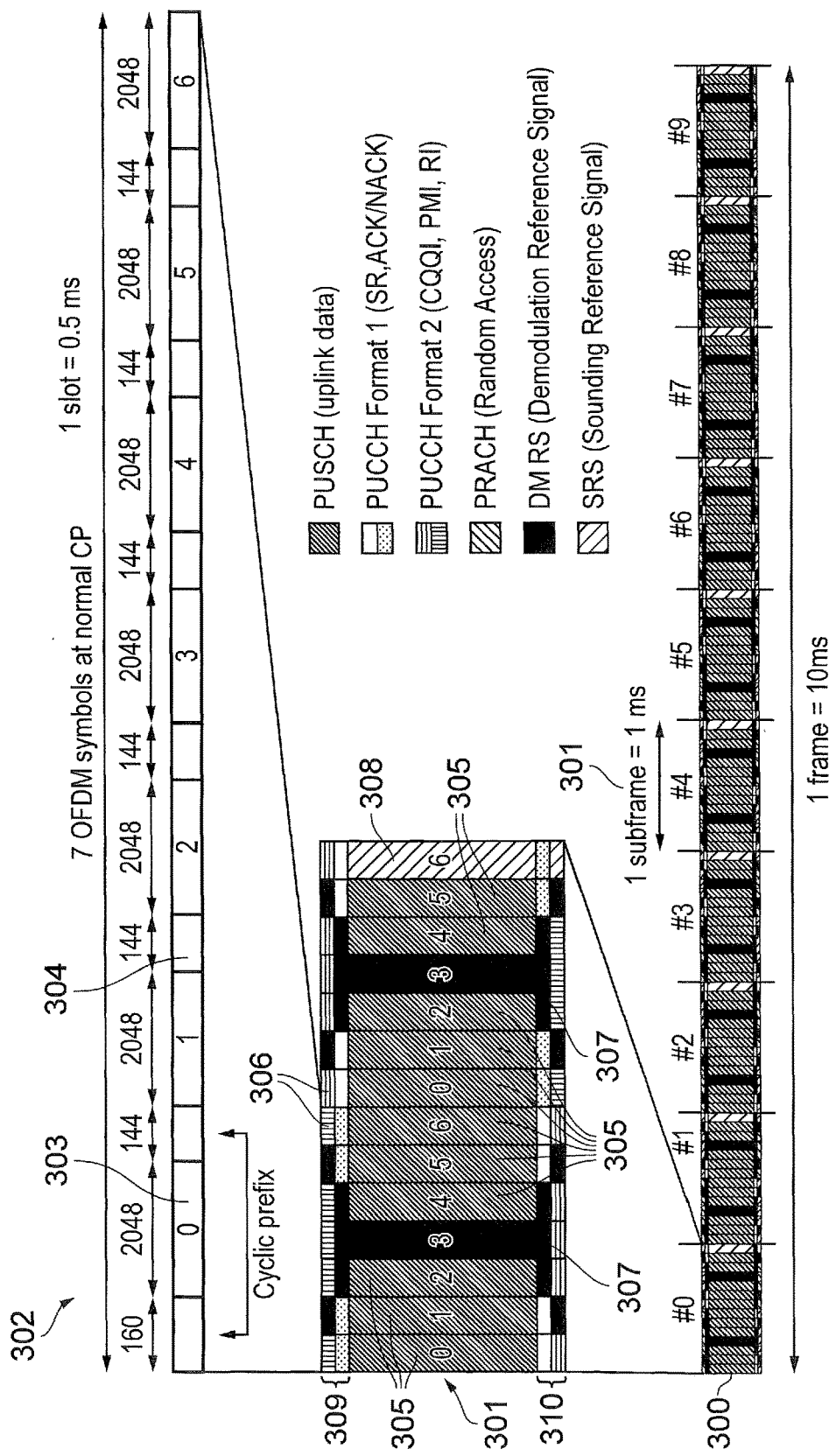
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
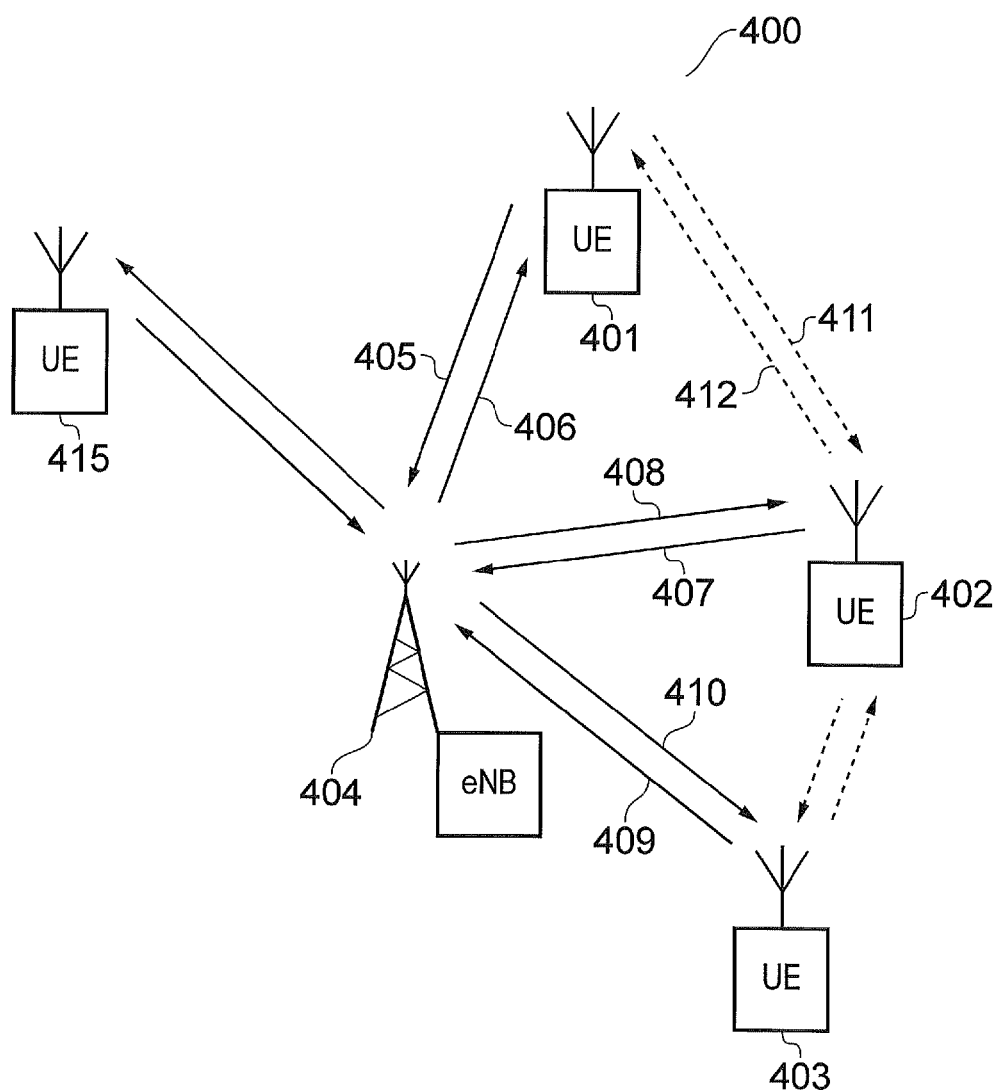
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Previously Proposed D2D Systems

It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia

[3] R2-134246, The Synchronizing Central Node for Out of Coverage D2D Communication; General Dynamics Broadband UK

[4] R2-134426, Medium Access for D2D communication; LG Electronics Inc

In another arrangement one of the UEs of the group first sends a scheduling assignment, and then transmits data without a central scheduling UE or controlling entity controlling the transmissions. The following disclosures provide examples of this de-centralised arrangement:

[5] R2-134238 D2D Scheduling Procedure; Ericsson;

[6] R2-134248, Possible mechanisms for resource selection in connectionless D2D voice communication; General Dynamics Broadband UK;

[7] R2-134431, Simulation results for D2D voice services using connectionless approach General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
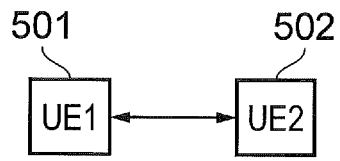
FIGS. 5a to 5d provides schematics diagrams of example device-to-device communications scenarios.

In FIG. 5a UEs 501 and 502 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
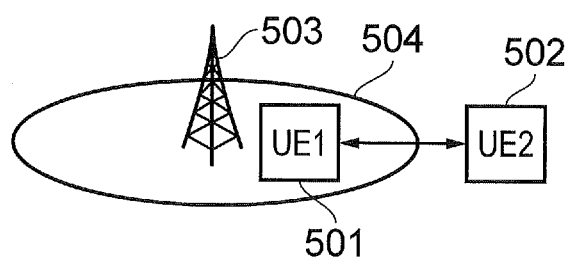

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
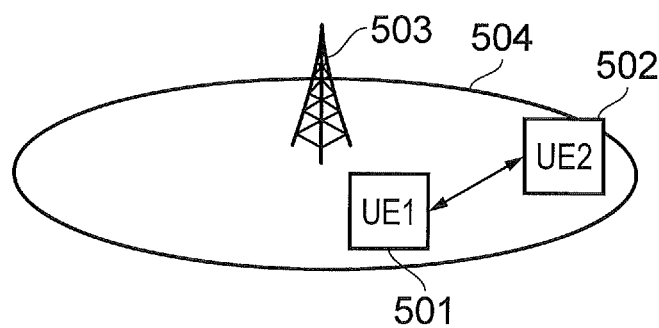

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
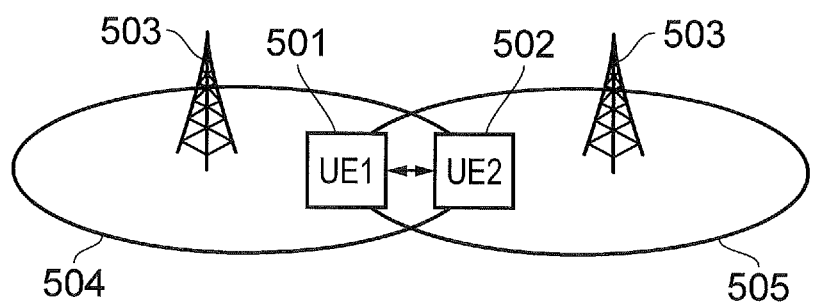

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used. Furthermore, as one of the motivating factors behind D2D communication is the increase in capacity that may result, utilising the downlink spectrum for D2D communications is not appropriate.

As previously described it would be desirable to provide an arrangement for D2D communications which do not significantly adversely affect conventional LTE communications when within a coverage area of one or more eNodeBs. To accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, because D2D communications may coexist with conventional communications within a system, it is also desirable that D2D resource allocations and transmission do not interfere and are transparent to other UEs so any adverse effects on other UEs are reduced.

Figure 6:
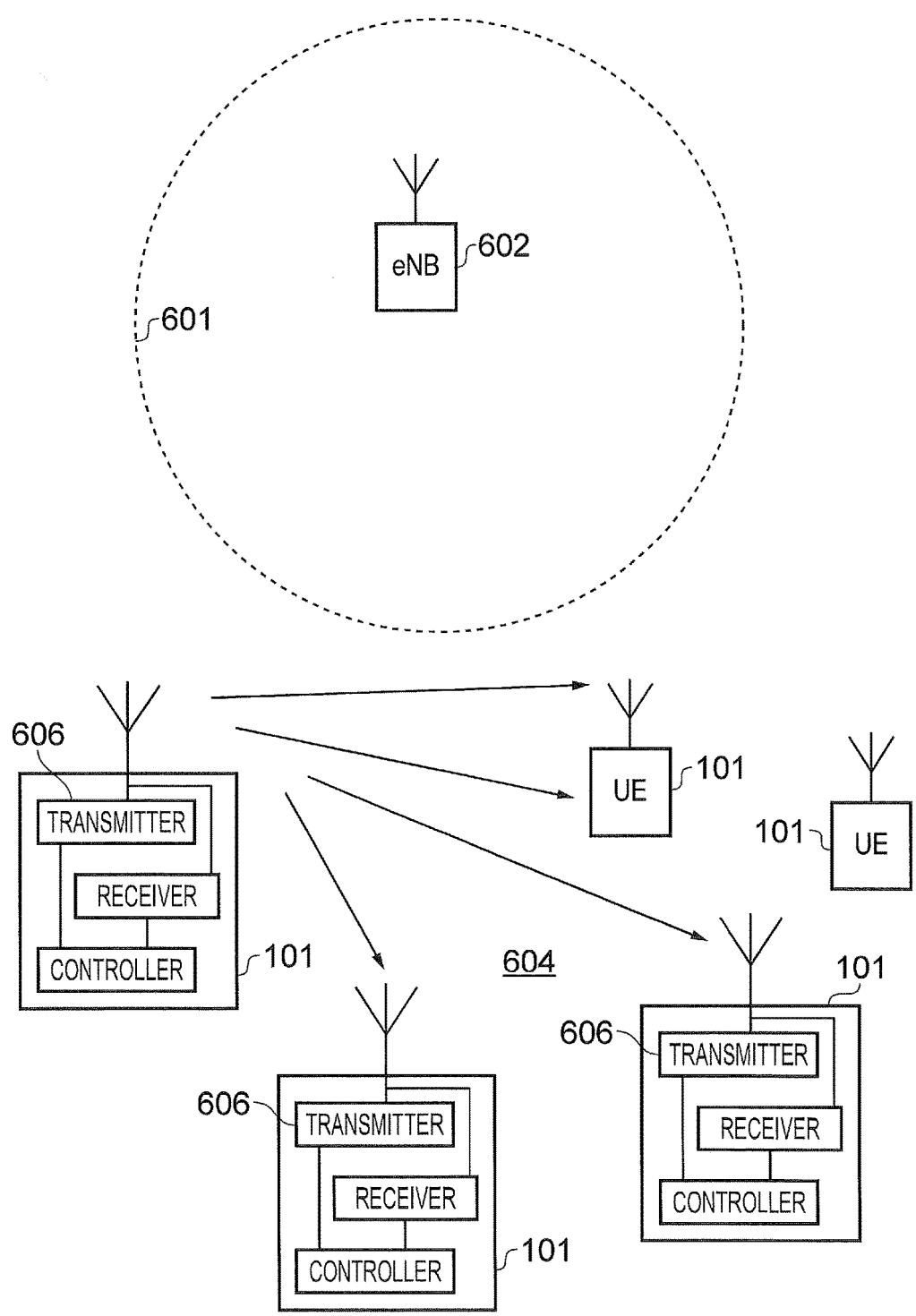
FIG. 6 provides a schematic block diagram illustrating an arrangement in which a plurality of communications devices form a group which perform device-to-device communications.

An example application is presented in FIG. 6. In FIG. 6, a plurality of communications devices 101 form a group of communications devices for which D2D communications is desired for the reasons explained above. As represented in FIG. 6, the communications devices 101 are outside a coverage area represented by a broken line 601 of a base station 602. As such the base station 602 cannot form or control any of the communications between the devices. However as mentioned above in some examples the group of communications devices may operate within a coverage area provided by the base station 602 and accordingly it is desirable that the transmission of signals by the communications devices 101 does not interfere with transmissions to or from the e-Node B 602 by conventional communications devices. As such, in some examples, a wireless access interface which is formed by the communications devices 101 for performing the D2D communications may utilise an uplink frequency of a conventional communications device. The wireless access interface can be arranged to transmit signals to the eNode B 602 when operating in a conventional mode, and to transmit and receive data via a mobile communications network of which the base station 602 forms a part.

As shown in FIG. 6, each of the UEs 101 includes a transmitter 606 and a receiver 608, which perform the transmission and reception of signals under the control of the controller 610. The controller 610 control the transmitter 606 and the receiver 608 to transmit and receive data between members of the group to perform D2D communications.

In the European patent application EP14153530.2 there is disclosed an arrangement for performing contentious resolution for device to device communications. Similarly an arrangement for allocating resources using a scheduling assignment messages transmitted in a scheduling assignment region of an uplink transmission frame is disclosed in European patent application 14153512.0. An arrangement in which communications devices of limited capability which may form machine to machine communications devices can be arranged to perform device to device communications within a limited set of resources (referred to as a virtual carrier) as disclosed in European patent application 14153536.9. Furthermore, an arrangement for identifying resources which can be used for device to device communications between a group of communications devices is disclosed in European patent application 14153540.1. The content of all of the above European patent applications are incorporated into the present application by reference.

Improved Device-to-Device Communications

Those acquainted with LTE will know that communications devices operating within a coverage area of an eNodeB are configured to transmit data using a hybrid automatic repeat request (HARQ) technique. As those familiar with HARQ will appreciate, data is transmitted using an HARQ technique by dividing the data into data units and encoding each data unit using a forward error correction code introducing redundant data into a resulting encoded data unit. The data may also be encoded to provide a separate parity check reference. Once the data has been transmitted from a transmitter to a receiver, the encoded data unit is decoded at the receiver, and the cyclic redundancy check is recalculated. If the cyclic redundancy check fails, then the data unit is concluded as being received in error. A negative acknowledgement (NACK) is transmitted, by the receiver or destination device to the transmitter device, which then either retransmits the encoded data unit or transmits more of the redundant data, which has been calculated for the encoded data unit. However, if the encoded data unit has been decoded successfully at the receiver then an acknowledgement (ACK) is transmitted to the transmitter. The transmitter can then transmit the next encoded data unit. In accordance with a conventional LTE arrangement, when a communications device is transmitting and receiving data via a base station or eNodeB, the ACK/NACK signals are transmitted as part of or piggybacked on to other control signals thereby making efficient use of the available communications resources.

In respect of device-to-device (D2D) communications an arrangement for HARQ has only been proposed in respect of a communications device transmitting data to a group of communications devices in accordance with a D2D communications protocol. This HARQ mechanism has been proposed for LTE release 12. However currently there is no proposal for one to one communications in respect of an HARQ scheme. That is the transmission of data from one communications device to another, when out of a coverage area of the LTE network, using a D2D communications protocol. In the case of a transmission of data to a group of devices, then any of the receiving devices of the group could transmit a NACK or ACK. In contrast for a one to one D2D communication, an ACK/NACK can be transmitted to the transmitting communications device (UE) to perform HARQ. Accordingly, in release 12 of LTE for D2D communications there is a "blind" HARQ transmission to improve reliability of one to many transmissions.

Figure 7:
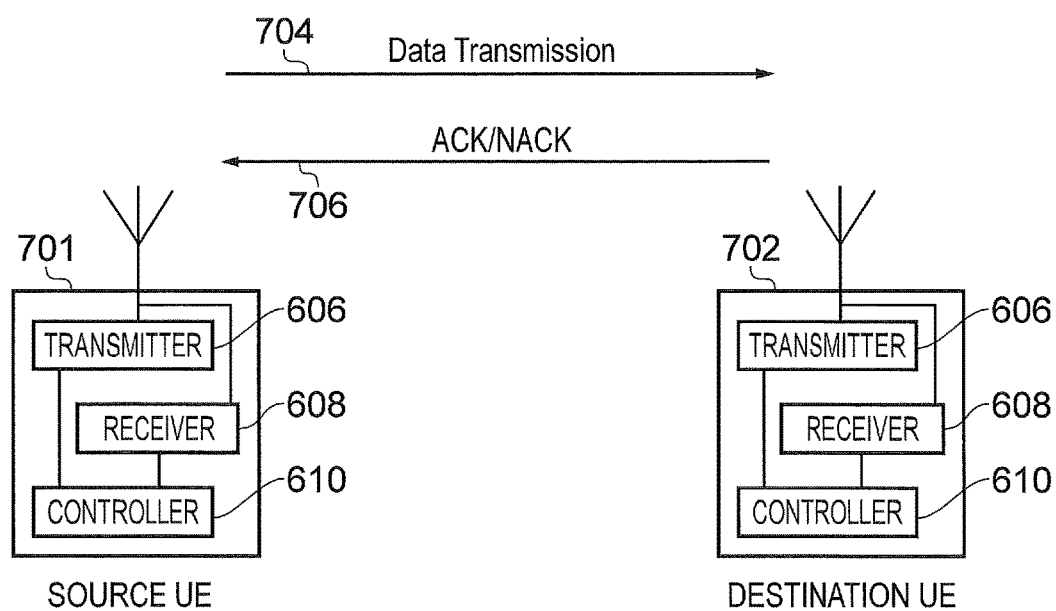
FIG. 7 is a schematic representation of a a source communications device and a destination communications device performing device-to-device communications in accordance with a Hybrid ARQ process.

FIG. 7 provides an example block diagram of two communications devices performing data transmission using an HARQ protocol. As shown in FIG. 7 one of the group of communications devices shown in FIG. 6 acts as a source UE 701 and another of the group of communications devices of the group shown in FIG. 6 acts as a destination or receiving UE 702. Each of the source 701 and destination UE 702 includes a transmitter 606, a receiver 608 and a controller 610. As represented by a first arrow 704 the source UE is arranged to transmit data to the destination UE 702 using an HARQ technique and so the destination UE 702 transmits an ACK or NACK signal represented by a second arrow 706 depending on whether the destination UE 702 has been able to receive and correctly recover a block of data (data unit) represented by the data transmission 704. Such a conventional arrangement is represented in FIG. 8.

Figure 8:
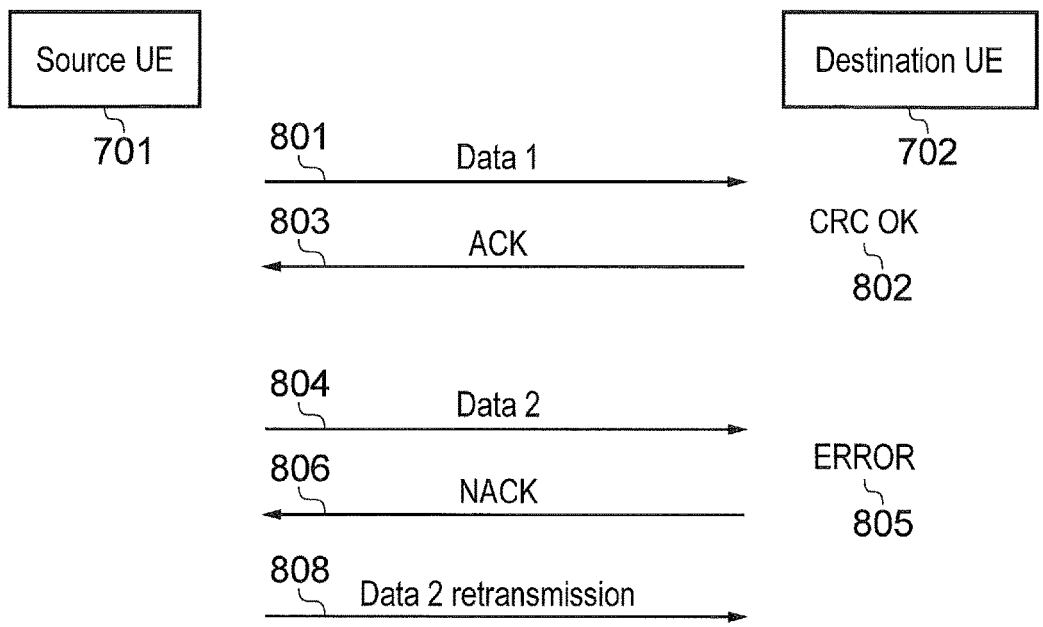
FIG. 8 is a part flow diagram part representation of a message exchange between a source communications device and a destination communications device representing a conventional Hybrid ARQ process for supporting device to device communications.

In FIG. 8 the source UE 701 transmits a first data unit represented by a first arrow 801. If the destination UE 702 recovers the data and the cyclic redundancy check (CRC) is correct then an ACK message is transmitted as represented by a second arrow 802. If the first data unit 801 was received correctly then the source UE 701 proceeds to transmit a second data unit of a set of data units comprising a data transmission as represented by a third arrow 804. However if the cyclic redundancy check fails when the destination UE 702 attempts to recover the data represented by the second data unit 804, and then a NACK is transmitted as represented by a fourth arrow 806. In that case the second data unit is retransmitted as represented by a fifth arrow 808. Such an arrangement can correspond to a conventional HARQ process.

Embodiments of the present technique can provide an improvement in an HARQ technique for one-to-one D2D communications. In accordance with a conventional arrangement as presented in FIG. 8, regardless of whether the transmission of a data unit is successful or unsuccessful the receiving or destination UE 702 always transmits an ACK or NACK message respectively to the source UE. When the destination/receiving UE does not receive anything then no feedback ACK/NACK message is sent. However, in order to transmit the ACK/NACK message then communications resources are required for the D2D transmission of the ACK/NACK message which must be scheduled in accordance with a D2D communications protocol. Therefore embodiments of the present technique provide an arrangement in which one of the NACK or the ACK message is not transmitted by the receiving or destination UE.

Figure 9:
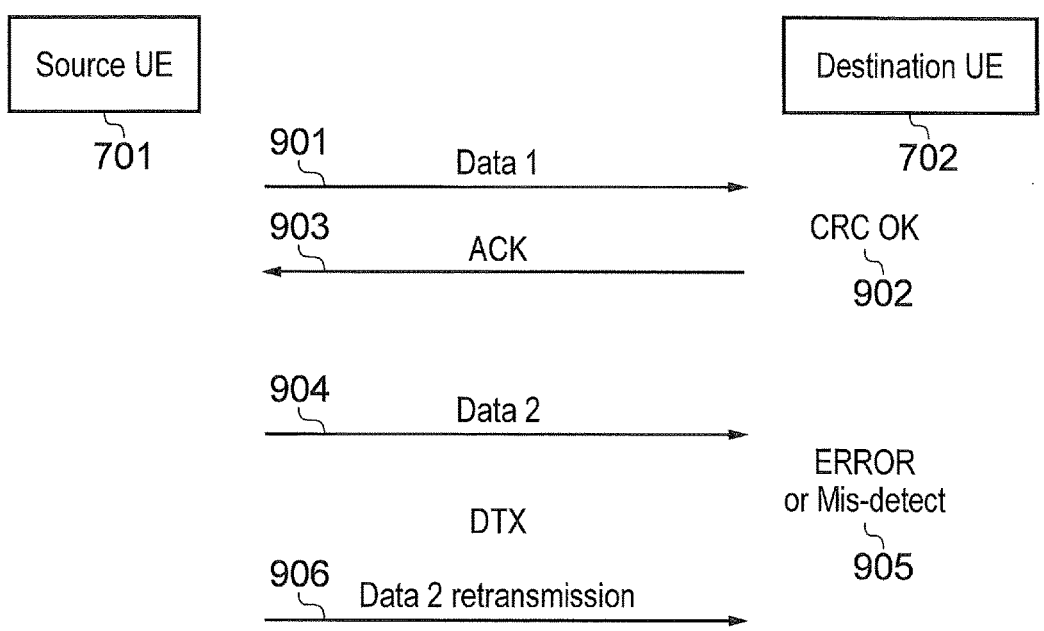
FIG. 9 is a part flow diagram part representation of a message exchange between a source communications device and a destination communications device representing a Hybrid ARQ process for supporting device to device communications according to an example of the present technique.

A first example is shown in FIG. 9. In FIG. 9, the NACK message is not transmitted by a receiving UE. Accordingly, for the example shown in FIG. 9, when a receiving UE 702 successfully decodes the received data block or unit then the receiving UE 702 transmits an ACK to the source UE 701. However when the receiving UE does not send any feedback, then the source UE 701 assumes after a predetermined time has passed without receiving an ACK that a NACK was concluded and retransmits the data unit. Thus transmitting a NACK is omitted from the protocol. Therefore as shown in FIG. 9 when the source UE 701 transmits a first data unit as represented by a first arrow 901 then the destination UE 702 attempts to decode the data unit 901. If the cyclic redundancy check of the received first data unit is correct at a processing point 902 then an ACK is transmitted from a destination UE 702 to the source UE 701 as represented by a second arrow 903. The source UE 701 then proceeds to transmit a second data unit as represented by a third arrow 904. However, in this case the second data unit as represented by the third arrow 904 is not received correctly as represented by process point 905. However, unlike the example shown in FIG. 8, no NACK message is transmitted by the destination UE 702 to the source UE 701. However, in accordance with this protocol for example after a predetermined time in which a ACK is not received by the source UE 701 then the source UE makes a retransmission of the second data unit as represented by a fourth arrow 906 or transmits more of the redundant data for decoding the second data unit. Accordingly, when the source UE 701 does not receive an ACK within a predetermined time then it assumes that the destination UE 702 did not receive the transmitted data unit and therefore assumes a NACK and proceeds to make a retransmission. However although the source UE 701 must wait for the predetermined time before commencing transmission of the next data unit or retransmitting the current data unit or redundant data relating to this data unit, the application of the data transmission for D2D type communications may not be time critical and therefore the increased delay may not have an adverse affect on the transmission of the data. On the contrary more important is saving capacity in respect of not requiring transmission of the NACK. Furthermore, an advantage of this example technique is that when the radio link quality becomes poor, and the transmission of the data is less likely to succeed, the source UE 701 does not have to receive the NACK before proceeding to perform a retransmission. Furthermore, the NACK itself may not be received by the source UE 701 and therefore simply assumes that the current data unit was not received unless and until an ACK is received.

Figure 10:
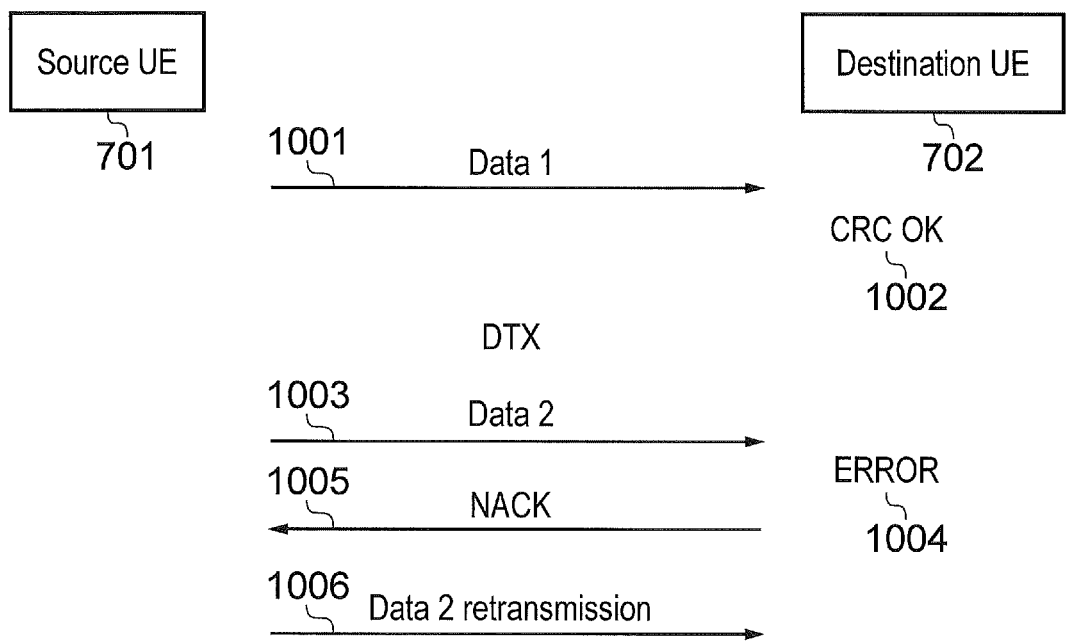
FIG. 10 is a part flow diagram part representation of a message exchange between a source communications device and a destination communications device representing a Hybrid ARQ process for supporting device to device communications according to another example of the present technique.

A corresponding example is shown in FIG. 10 in which a one to one D2D communications protocol for HARQ is arranged in accordance with the present technique and in which an ACK is not transmitted as part of the HARQ process. As shown in FIG. 10 first data unit is transmitted from the source UE 701 to the destination UE 702 as represented by a first arrow 1001. The destination UE then decodes the received data unit and for the example shown in FIG. 10 in a process step point 1002 the destination UE determines that the CRC check was correct. However, the destination UE 702 does not transmit the ACK to the source UE 701. Therefore if a NACK is not received within a predetermined time then the source UE begins to transmit the second data unit as represented by a second arrow 1003. This is because it assumes that if it has not received a transmission from the destination UE 702 within the predetermined time then the destination UE 702 would have transmitted an ACK and therefore the data unit was transmitted successfully. However as shown by a process point 1004, for the present example the destination UE performs a CRC check on the second data unit as represented by the second arrow 1003 and in this example determines that the second data unit was received in error. Accordingly the destination UE 702 transmits a NACK as represented by the third arrow 1005. Having received the NACK via the arrow 1005, the source UE 701 then retransmits the second data unit or transmits more of the redundant data for decoding the second data unit as represented by the fourth arrow 1006 in accordance with the HARQ protocol. According to this example embodiment, when a transmission is not successful and therefore requires a retransmission then a NACK is transmitted from the receiving UE 702 to the source UE 701, otherwise the destination or receiving UE 702 sends no other feedback. No transmission is therefore regarded as an ACK so that the ACK is omitted and does not have to be scheduled by the D2D communications protocol. Accordingly, when the transmission of data is during a period in which radio communications are good, then there is a reduction and therefore saving in capacity in the transmission of the ACK message. Accordingly, since only a NACK is transmitted, in one example, a missing sequence number for a transmitted data unit can be included in the NACK message. In other examples, where poll bits are used, after ever X blocks and packet data units (PDU's) a UE transmits an ACK in response to a poll bit.

An example in which a poll bit is used is where part of the radio link control (RLC) layer ARQ. For the example of regular LTE acknowledged mode (AM) RLC operation the transmitter maintains a count of 1) number of PDUs and 2) number of transmitted bytes. When either meets a predetermined threshold then a poll bit is set in order to request NACK/ACK report from the receiver. This allows for continuous transmission without having to wait for an ACK. Then only the not acknowledged PDUs are retransmitted and other PDUs can be erased from the retransmission buffer. Accordingly, the sender requests the status report with a poll bit=on, and the receiver reads the poll bit and sends a status report back. The status report includes which packet is correctly received in the X blocks or which packets are not. The sender may retransmit the data based on status report.

As will be appreciated, these examples of ARQ and HARQ may require a larger amount of acknowledgement signalling data to include missing PDU's. In accordance with the present technique as will be appreciated, in some examples, an ACK message only is transmitted whereas in others a NACK message only is transmitted. However in some examples it is necessary to transmit an "keep alive" transmission to ensure that the source UE 701 still remains in an active mode for receiving data if no transmission is made for a predetermined time. The "keep alive" is an application layer message. In this example, a UE represents a "keep alive" message as L1/L2 messages like dummy bits or L1 signalling in addition to ACK/NACK/DTX. In some examples as explained in our co-pending EP patent application 14153512.0 a scheduling assignment arrangement is used in order for a UE to transmit a resource request in a scheduling assignment region which correspondingly reserves the resources in a shared or common part. However in some examples a feedback channel may be provided in order for the UE to transmit the ACK/NACK message or keep alive transmission.

Additional Information for MCS Correction

As will be appreciated in accordance with a conventional arrangement an HARQ process under LTE usually transmits a selected modulation and coding scheme (MCS) indication along with a transport block size (TBS) which is adapted in accordance with a quality of the radio channel between the transmitter and the receiver. For one to many communications a quality of the radio link differs between the source UE and each of the receiving UEs. As such, the MCS which is appropriate for each channel may be different. However, in one to one communication the channel quality between a specific source UE and destination UE can be used to set an optimised MCS.

NACK and MCS Correction

For an example embodiment in which the destination UE 702 sends the NACK message only and not the ACK message, then a MCS and TBS which has been used by the source UE 701 is likely to be unsuitable for the channel quality between the source UE 701 and the destination UE 702. Accordingly, the MCS can be increased to improve a likelihood of correctly receiving the data correctly. When the destination UE 702 detects a decoding error (CRC error) the destination UE 702 sends the NACK. In addition to the NACK the destination UE 702 can also send a correction indication for adjusting the MCS or a channel quality measurement to the source UE 701. Accordingly, when the next retransmission occurs or the next data unit (PDU) is selected for transmission, the source UE 701 can select a corresponding MCS value.

ACK and MCS Correction

In accordance with another example embodiment, when the destination UE 702 sends ACK messages only, then a selected MCS/TBS size sent or used by the source UE 701 could be the correct value. However, the channel quality may be better than that required for a particularly MCS so that more redundancy and channel capacity is being used than is necessary for the actual channel link quality. This means that the source UE 701 has underestimated the channel quality present. According to this example when the destination UE 702 detects that there has been a deviation between the actually channel quality measured and that of the corresponding selected MCS used at the source UE 701, then the destination UE 702 sends an MCS correction indication to the source UE 701 in addition to and with the ACK message. Two example arrangements for making MCS corrections are as follows:

Solution 1; based on error rate

In a first example of MCS correction, the destination UE 702 can know the average error rate based on the ratio of ACK/NACK which it sends back to source UE 701. The target error rate depends on QoS requirements, but typically 10% error rate is common. If the destination UE 702 detects the lower error rate than target, a lower MCS could be selected. The destination UE 702 sends the correction information in addition to an ACK to the source UE 701. For example, the destination UE 702 sends a suggested MCS or error rate itself to the source UE 701. The source UE 701 can then change the MCS based on the feedback from destination UE 702.

Solution 2; based on measurement

In a second example, the source UE 701 sends a discovery signal which includes a synchronization signal (D2DSS). The source UE 701 also sends a reference signal in the PUSCH of D2D communication. The destination UE 702 can receive those signals and estimate the channel quality and feedback to source UE 701.

Of the above two examples, solution 1 is suitable for long duration (because the averaging is needed); whereas solution 2 is suitable for short duration (because it is instantaneous channel quality).

DTX and Channel Quality

When a destination or receiving UE 702 does not receive any transmitted data from the source UE 701, then the destination UE 702 should send neither an ACK nor a NACK message, which corresponds to a situation called Discontinuous Transmission (DTX). In such an example, the destination UE 702 cannot make a distinction as to whether no data has been transmitted to the destination UE 702 or a channel quality is so poor that the transmitted data cannot be received.

It would be useful for the source UE 701 to know that the channel quality is too poor for transmitted data to be received. If the source UE 701 knows that the channel quality is too poor to receive data then the source UE 701 may change the communications resources (frequency channel or time slot) or change transmission parameters for example using frequency hopping. Accordingly, in some examples if no ACK or NACK message is received by a source UE 701 within a predetermined time, then the UE assumes that the channel quality is too poor for the destination or receiving UE 702 to receive the transmitted data unit and accordingly changes to different communications resources.

According to the example embodiments of the present technique as represented above, there is provided an arrangement for one to one D2D communications which incorporates an HARQ process in which one of an ACK or NACK message is not transmitted therefore releasing some of the communications resources which would otherwise be taken by transmission of the ACK or NACK message. However there are still communications resources required to transmit the other of the ACK or the NACK messages. Accordingly it is possible to reuse the communications resources of a D2D protocol in order to effect an HARQ process which does not require centralised control from a base station or eNodeB.

SUMMARY

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to other LTE system structures and other systems which are compatible with D2D communications.

The following clauses define further example aspects and features of the present technique:

1. A method of communicating data using a communications device via a wireless access interface to perform device-to-device communications, the method comprising dividing the data into a plurality of data units, encoding a first of the data units, at the communications device for transmission to a destination communications device in accordance with a repeat request protocol, the encoding providing redundant data which can improve an integrity of correctly recovering the first data unit when received by the destination communications device and provide an indication of whether the first data unit has been received correctly, transmitting the encoded data unit to the destination communications device, and either receiving, from the destination communications device, an acknowledgement message, ACK, indicating that the data unit has been received correctly by the destination communications device, or if, after a predetermined time has elapsed, an ACK message is not received by the communications device, then retransmitting at least part of the encoded data unit to the destination communications device in accordance with the repeat request process, the communications device assuming that the destination communications device determined that the data unit was not received correctly in accordance with a decoding process performed by the destination communications device, or receiving, from the destination communications device, a negative acknowledgement message, NACK, providing an indication that the destination communications device determined that the data unit was not received correctly in accordance with a process of decoding the received encoded data unit performed by the destination communications device, or if, after a predetermined time has elapsed, an ACK message is not received then encoding a next one of the data units, and transmitting the next encoded data unit to the destination communications device in accordance with the repeat request protocol.

2. A method of communicating data according to clause 1, comprising receiving, after not receiving an ACK message for a second predetermined time corresponding to one or more times the first predetermined time, a keep alive message from the destination communications device, and in response to the keep alive message, continuing to retransmit the encoded data unit, or if a keep alive message is not received after the second predetermined since receiving an ACK message, switching to an idle state.

3. A method of communicating according to clause 1 or 2, comprising receiving, with an ACK message an indication of a relative channel state with respect to at least one of a modulation scheme and an amount of redundant data introduced by the error correction encoding, and in response to receiving the indication of the relative channel state, adjusting at least one of the modulation scheme and the amount of redundant data introduced by the error correction encoding, according to the relative channel state.

4. A method of communicating according to clause 1 or 2, comprising counting a number of ACK messages received within a third predetermined time, determining a relative channel state based on the number of ACK messages received within the third predetermined time, and adjusting at least one of the modulation scheme and the amount of redundant data introduced by the error correction encoding, according to the relative channel state.

5. A method of communicating according to clause 4, wherein if no ACK message is received within the third predetermined time, changing at least one of a transmission channel or a time slot for transmitting the next encoded data unit.

6. A method of communicating data according to clause 1, comprising receiving, after not receiving a NACK message for a second predetermined time corresponding to one or more times the first predetermined time, a keep alive message from the destination communications device, and in response to the keep alive message, continuing to transmit the next encoded data unit, or if a keep alive message is not received after the second predetermined since receiving a NACK message, switching to an idle state.

7. A method of communicating according to clause 1 or 6, comprising receiving, with a NACK message an indication of a relative channel state with respect to at least one of a modulation scheme and an amount of redundant data introduced by the error correction encoding, and in response to receiving the indication of the relative channel state, adjusting at least one of the modulation scheme and the amount of redundant data introduced by the error correction encoding, according to the relative channel state.

8. A method of communicating according to clause 1 or 6, comprising counting a number of NACK messages received within a third predetermined time, determining a relative channel state based on the number of NACK messages received within the third predetermined time, and adjusting at least one of the modulation scheme and the amount of redundant data introduced by the error correction encoding, according to the relative channel state.

9. A method of communicating according to clause 8, wherein if no NACK message is received within the third predetermined time, changing at least one of a transmission channel or a time slot for transmitting the next encoded data unit 10. A method of communicating data according to clause 1, 5, 6 or 7, wherein the transmitting the NACK signal includes transmitting a sequence number of one of more of the encoded data units which have not been received correctly by the destination communications device.

11. A method of communicating data according to clause 1, wherein the receiving, from the destination communications device, the acknowledgement message, comprising transmitting a poll message to the destination communications device, and receiving, from the destination communications device, the acknowledgement message, in response to the poll message.

12. A communications device comprising a transmitter configured to transmit signals to one or more other communications devices via a wireless access interface to perform device-to-device communications, via receiver configured to receive signals from the one or more other communications devices via the wireless access interface, and a controller for controlling the transmitter and the receiver to transmit or to receive the signals via the wireless access interface to transmit or to receive data represented by the signals, and the controller is configured to divide data for transmission into a plurality of data units, to encode a first of the data units for transmission to a destination communications device in accordance with a repeat request protocol, the encoding providing redundant data which can improve an integrity of correctly recovering the first data unit when received by the destination communications device and provide an indication of whether the first data unit has been received correctly, to transmit the encoded data unit to the destination communications device, and either to receive, from the destination communications device, an acknowledgement message, ACK, indicating that the data unit has been received correctly by the destination communications device, or if, after a predetermined time has elapsed, an ACK message is not received by the receiver, then to retransmit at least part of the encoded data unit to the destination communications device in accordance with the repeat request process, assuming that the destination communications device determined that the data unit was not received correctly in accordance with a decoding process performed by the destination communications device, or to receive, from the destination communications device, a negative acknowledgement message, NACK, providing an indication that the destination communications device determined that the data unit was not received correctly in accordance with a process of decoding the received encoded data unit performed by the destination communications device, or if, after a predetermined time has elapsed, an ACK message is not received then to encode a next one of the data units, and to transmit the next encoded data unit to the destination communications device in accordance with the repeat request protocol.

13. A method of receiving data at a destination communications device from a source communications device, the method comprising receiving an encoded data unit from the source communications device, decoding the encoded data unit in accordance with a predetermined decoding scheme, determining in accordance with the decoding of the encoded data unit whether the data unit has been received correctly or not correctly, and either transmitting, to the source communications device, an acknowledgement, ACK, message indicating that the data unit has been received correctly, and if, the data unit was determined not to have been received correctly in accordance with the decoding not transmitting an ACK message, or a negative acknowledgement, NACK, message, or transmitting, to the source communications device, a NACK message providing an indication that the data unit was not received correctly in accordance with the decoding of the received encoded data unit and if the data unit was determined to have been received correctly in accordance with the decoding not transmitting a NACK message or an ACK message.

14. A method of receiving data according to clause 13, comprising transmitting, after not transmitting an ACK message for a second predetermined time corresponding to one or more times the first predetermined time, a keep alive message to the source communications device.

15. A method of receiving according to clause 13 or 14, comprising determining a relative measure of a state of a channel through which the encoded data unit is received, and transmitting, with an ACK message an indication of a relative channel state with respect to at least one of a modulation scheme and an amount of redundant data introduced by the error correction encoding.

16. A method of receiving according to clause 13 or 14, wherein the determining a relative measure of a state of a channel through which the encoded data unit is received comprises counting a number of encoded data units which are determined to have been successfully received within a third predetermined time, determining a relative channel state based on the number of encoded data units which are determined to have been successfully received within a third predetermined time.

17. A method of receiving data according to clause 13, comprising transmitting, after not transmitting a NACK message for a second predetermined time corresponding to one or more times the first predetermined time, a keep alive message to the source communications device.

18. A method of receiving according to clause 13 or 17, comprising determining a relative measure of a state of a channel through which the encoded data unit is received, and transmitting, with a NACK message an indication of a relative channel state with respect to at least one of a modulation scheme and an amount of redundant data introduced by the error correction encoding.

19. A method of receiving data according to clause 13, comprising transmitting, after not transmitting a NACK message for a second predetermined time corresponding to one or more times the first predetermined time, a keep alive message to the source communications device.

20. A method of receiving data according to clause 13, wherein the receiving an encoded data unit from the source communications device, comprises receiving the encoded data unit from a third communications device, which has received the encoded data unit from the source communications device.

REFERENCES

[1] R2-133840, "CSMA/CA based resource selection," Samsung, published at 3GPP TSG-RAN WG2 #84, San Francisco, USA, 11-15 Nov. 2013.

[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.

[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.

[4] R2-134426, "Medium Access for D2D communication", LG Electronics Inc, published at 3GPP TSG-RAN WG2 #84, San Francisco, USA, 11-15 Nov. 2013.

[5] R2-134238, "D2D Scheduling Procedure", Ericsson, published at 3GPP TSG-RAN WG2 #84, San Francisco, USA, 11-15 Nov. 2013.

[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.

[7] R2-134431, "Simulation results for D2D voice services using connectionless approach", General Dynamics Broadband UK, published at 3GPP TSG-RAN WG2 #84, San Francisco, USA, 11-15 Nov. 2013.

[8] "D2D Resource Allocation under the Control of BS", Xiaogang R. et al, University of Electronic Science and Technology of China, https://mentor.ieee.org/802.16/dcn/13/16-13-0123-02-000n-d2d-resource-allocation-under-the-control-of-bs.docx

[9] US20130170387

[10] US20120300662

[11] LTE for UMTS: OFDMA and SC-FDMA Based Radio Access, Harris Holma and Antti Toskala, Wiley 2009, ISBN 978-0-470-99401-6.

The invention claimed is:

1. A method of communicating data using a communications device via a wireless access interface to perform device-to-device communications, the method comprising:

dividing the data into a plurality of data units;

encoding a first of the data units at the communications device for transmission to a destination communications device in accordance with a repeat request protocol, the encoding providing redundant data which can improve an integrity of correctly recovering the first data unit when received by the destination communications device and provide an indication of whether the first data unit has been received correctly;

transmitting the encoded data unit to the destination communications device;

if, after a first predetermined time has elapsed, an acknowledgement (ACK) message is not received, then encoding a next one of the data units and transmitting the next encoded data unit to the destination communications device in accordance with the repeat request protocol;
receiving a keep alive message from the destination communications device after not receiving the ACK message for a second predetermined time that corresponds to one or more multiples of the first predetermined time;
continuing to retransmit the encoded data unit in response to the keen alive message; and
switching to an idle state if the keep alive message is not received after the second predetermined time since receiving the AC message.

2. The method of communicating as claimed in claim 1, further comprising:
receiving, with an ACK message, an indication of a relative channel state with respect to at least one of a modulation scheme and an amount of redundant data introduced by the error correction encoding; and
in response to receiving the indication of the relative channel state, adjusting at least one of the modulation scheme and the amount of redundant data introduced by the error correction encoding, according to the relative channel state.

3. The method of communicating as claimed in claim 1, further comprising:
counting a number of ACK messages received within a third predetermined time;
determining a relative channel state based on the number of ACK messages received within the third predetermined time; and
adjusting at least one of the modulation scheme and the amount of redundant data introduced by the error correction encoding, according to the relative channel state.

4. The method of communicating as claimed in claim 3, further comprising:
changing at least one of a transmission channel or a time slot for transmitting the next encoded data unit if no ACK message is received within the third predetermined time.

5. The method of communicating data as claimed in claim 1, further comprising:
receiving a keep alive message from the destination communications device after not receiving a negative acknowledgement (NACK) message for a second predetermined time corresponding to one or more multiples of the first predetermined time, and
continuing to transmit the next encoded data unit in response to the keep alive message; and
switching to an idle state if a keep alive message is not received after the second predetermined since receiving the NACK message.

6. The method of communicating as claimed in claim 1, further comprising:
receiving, with a negative acknowledgement (NACK) message, an indication of a relative channel state with respect to at least one of a modulation scheme and an amount of redundant data introduced by the error correction encoding; and
in response to receiving the indication of the relative channel state, adjusting at least one of the modulation scheme and the amount of redundant data introduced by the error correction encoding, according to the relative channel state.

7. The method of communicating as claimed in claim 1, further comprising:
counting a number of negative acknowledgement (NACK) messages received within a third predetermined time;
determining a relative channel state based on the number of NACK messages received within the third predetermined time; and
adjusting at least one of the modulation scheme and the amount of redundant data introduced by the error correction encoding, according to the relative channel state.

8. The method of communicating as claimed in claim 7, further comprising:
changing at least one of a transmission channel or a time slot for transmitting the next encoded data unit if no negative acknowledgement (NACK) message is received within the third predetermined time.

9. The method of communicating data as claimed in claim 1, wherein the transmitting the negative acknowledgement (NACK) signal includes transmitting a sequence number of one of more of the encoded data units which have not been received correctly by the destination communications device.

10. The method of communicating data as claimed in claim 1, wherein the receiving the acknowledgement message from the destination communications device further comprises:
transmitting a poll message to the destination communications device; and
receiving, from the destination communications device, the acknowledgement message, in response to the poll message.

11. A communications device comprising:
a transmitter configured to transmit signals to one or more other communications devices via a wireless access interface to perform device-to-device communications;
a receiver configured to receive signals from the one or more other communications devices via the wireless access interface; and
circuitry for controlling the transmitter and the receiver to transmit or to receive the signals via the wireless access interface to transmit or to receive data represented by the signals, wherein the circuitry is configured
to divide data for transmission into a plurality of data units;
to encode a first of the data units for transmission to a destination communications device in accordance with a repeat request protocol, the encoding providing redundant data which can improve an integrity of correctly recovering the first data unit when received by the destination communications device and provide an indication of whether the first data unit has been received correctly;
to transmit the encoded data unit to the destination communications device;
if, after a first predetermined time has elapsed, an acknowledgement (ACK) message is not received, then to encode a next one of the data units and to transmit the next encoded data unit to the destination communications device in accordance with the repeat request protocol:
to receive a keep alive message from the destination communications device after not receiving the ACK message for a second predetermined time that corresponds to one or more multiples of the first predetermined time;
to continue to retransmit the encoded data unit in response to the keep alive message; and to switch to an idle state if the keep alive message is not received after the second predetermined time since receiving the ACK message.

12. A method of receiving data at a destination communications device from a source communications device, the method comprising:
   receiving an encoded data unit from the source communications device;
   decoding the encoded data unit in accordance with a predetermined decoding scheme;
   determining in accordance with the decoding of the encoded data unit whether the data unit has been received correctly or not correctly;
   when it is determined that the data unit has been received correctly, not sending an acknowledgement (ACK) message; and
   transmitting a keep alive message to the source communications device after not transmitting an ACK message for a predetermined time.

13. The method as claimed in claim 12, further comprising:
   determining a relative measure of a state of a channel through which the encoded data unit is received; and
   transmitting an indication of a relative channel state with respect to at least one of a modulation scheme and an amount of redundant data introduced by the error correction encoding.

14. The method as claimed in claim 12, wherein the determining a relative measure of a state of a channel through which the encoded data unit is received comprises:
   counting a number of encoded data units which are determined to have been successfully received within another predetermined time; and
   determining a relative channel state based on the number of encoded data units which are determined to have been successfully received within the another predetermined time.

15. The method claimed in claim 12, further comprising:
   determining a relative measure of a state of a channel through which the encoded data unit is received; and
   transmitting, with a negative acknowledgement (NACK) message an indication of a relative channel state with respect to at least one of a modulation scheme and an amount of redundant data introduced by the error correction encoding.

16. The method as claimed in claim 12, wherein the receiving an encoded data unit from the source communications device, comprises:
   receiving the encoded data unit from a third communications device, which has received the encoded data unit from the source communications device.

17. A communications device comprising:
   a transmitter configured to transmit signals to one or more other communications devices via a wireless access interface to perform device-to-device communications;
   a receiver configured to receive signals from the one or more other communications devices via the wireless access interface; and
   circuitry for controlling the transmitter and the receiver to transmit or to receive the signals via the wireless access interface to transmit or to receive data represented by the signals, wherein the circuitry is configured
   to receive an encoded data unit from a source communications device;
   to decode the encoded data unit in accordance with a predetermined decoding scheme;
   to determine in accordance with the decoding of the encoded data unit whether the data unit has been received correctly or not correctly;
   when it is determined that the data unit has been received correctly, not to send an acknowledgement (ACK) message;
   to transmit a keep alive message to the source communications device after not transmitting an ACK message for a predetermined time.

18. A user equipment comprising:
   transmitter circuitry configured to transmit signals to one or more other communications devices via a wireless access interface to perform device-to-device communications;
   receiver circuitry configured to receive signals from the one or more other communications devices via the wireless access interface; and
   controller circuitry for controlling the transmitter and the receiver to transmit or to receive the signals via the wireless access interface to transmit or to receive data represented by the signals, the wireless access interface including a plurality of predetermined sections of shared communications resources in time divided units, wherein the controller circuitry is configured
   to divide data for transmission into a plurality of data units;
   to encode a first of the data units for transmission to a destination communications device in accordance with a repeat request protocol, the encoding providing redundant data which can improve an integrity of correctly recovering the first data unit when received by the destination communications device and provide an indication of whether the first data unit has been received correctly;
   to transmit the encoded data unit to the destination communications device;
   if, after a first predetermined time has elapsed, an acknowledgement (ACK) message is not received then to encode a next one of the data units, and to transmit the next encoded data unit to the destination communications device in accordance with the repeat request protocol;
   to receive a keep alive message from the destination communications device after not receiving the ACK message for a second predetermined time that corresponds to one or more multiples of the first predetermined time;
   to continue to retransmit the encoded data unit in response to the keep alive message; and
   to switch to an idle state if the keep alive message is not received after the second predetermined time since receiving the AC message.

19. A user equipment comprising:
   transmitter circuitry configured to transmit signals to one or more other communications devices via a wireless access interface to perform device-to-device communications;
   receiver circuitry configured to receive signals from the one or more other communications devices via the wireless access interface; and
   controller circuitry for controlling the transmitter and the receiver to transmit or to receive the signals via the wireless access interface to transmit or to receive data represented by the signals, the wireless access interface including a plurality of predetermined sections of shared communications resources in time divided units, wherein the controller circuitry is configured to receive an encoded data unit from a source communications device;
to decode the encoded data unit in accordance with a predetermined decoding scheme;
to determine in accordance with the decoding of the encoded data unit whether the data unit has been received correctly or not correctly;
when it is determined that the data unit has been received correctly, not to send an acknowledgement (ACK) message;
transmit a keep alive message to the source communications device after not transmitting an ACK message for a predetermined time.

* * * * *